Patented Mar. 26, 1935

1,995,933

UNITED STATES PATENT OFFICE 1,995,933

WATER - INSOLUBLE MONO - AZO - DYE- STUFFS AND FIBER DYED THEREWITH

Leopold Laska and Arthur Zitscher, Offenbach-on-the-Main, Ernst Fischer, Frankfort-on-the-Main, and Wilhelm Lamberz, Leverkusen-Wiesdorf, Germany, assignors to General Aniline Works, Inc., New York, N. Y., a corporation of Delaware No Drawing. Application August 25, 1933, Serial No. 686,851. In Germany September 9, 1932

10 Claims. (Cl. 260—95)

The present invention relates to water-insoluble mono-azo-dyestuffs and to fiber dyed therewith; more particularly it relates to dyestuffs of the following general formula:

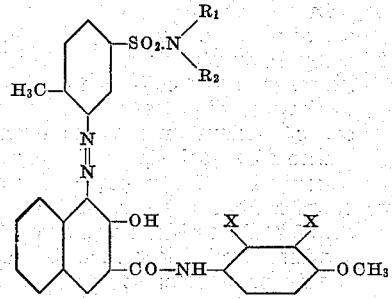

wherein one X stands for hydrogen and the other X for methyl, $R_1$ means an alkyl, aralkyl or a completely hydrogenated hydroaromatic radical, $R_2$ an alkyl, aryl or aralkyl radical.

We have found that valuable red mono-azo-dyestuffs are obtainable by coupling the diazo-compounds of the bases of the following general formula:

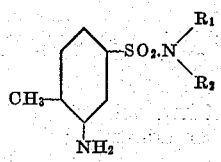

wherein $R_1$ represents an alkyl, aralkyl or a completely hydrogenated hydro-aromatic radical, $R_2$ an alkyl, aryl or aralkyl radical, with 1-(2'.3'-hydroxynaphthoylamino) - 4 - methoxy-benzenes which are further substituted in the ortho- or meta-position to the methoxy group by a methyl group, provided that the diazo-components do not contain any solubilizing group such as, for instance, the sulfonic or carboxylic acid group.

The dyestuffs may be produced in known manner in substance, on the fiber or on any of the usual substrata adapted for the production of lakes; when produced on the fiber, they yield vivid shades of very good fastness properties.

The dyestuffs of the present invention are distinguished by an essentially better fastness to light than the azo-dyestuffs obtainable according to the statements of the U. S. Patent No. 1,678,-599 by coupling diazotized 1-amino-6-methyl-benzene-3-sulfonic acid amides with 1-(2'.3'-hydroxynaphthoylamino)-4-ethoxybenzene, 1-(2'.3'-hydroxynaphthoylamino) - 3 - methylbenzene, 1-(2'.3'-hydroxynaphthoylamino)-2-methoxy-4-chlorobenzene or with 1-(2'.3'-hydroxynaphthoylamino) -2-methoxy-5-chlorobenzene.

The following examples serve to illustrate the invention, but they are not intended to limit it thereto:

*Dyeing prescription for Examples 1-8*

50 grams of well-boiled cotton yarn are treated at 35° C. to 40° C. with the grounding liquor for half-an-hour, well freed from water by squeezing or centrifuging and developed for half-an-hour in the dye bath; the dyed yarn is well rinsed, soaped at boiling temperature, rinsed again and dried.

*(1) (a) Grounding liquor*

6 grams of 1-(2'.3'-hydroxynaphthoylamino)- 2-methyl-4-methoxy-benzene are dissolved at boiling temperature in
10 cc. of caustic soda solution of 34° Bé.,
10 cc. of Turkey red oil 1:2 and
900 cc. of water. The whole is then made up with water to 1000 cc.

*(b) Dye bath*

2.42 grams of 2-amino-toluene-4-sulfonic acid diethylamide are diazotized in the usual manner with
3.1 cc. of hydrochloric acid 20° Bé. and
8 cc. of sodium nitrite solution 1:10. The diazo solution is then rendered neutral to Congo-paper by means of
72 cc. of sodium acetate solution 1:5,
140 cc. of sodium chloride solution 1:5 are added and the whole is made up with cold water to 1000 cc.

There is obtained a vivid red dyeing of very good fastness to washing, to chlorine, to boiling-lye and especially to light. The dyestuff corresponds to the following formula:

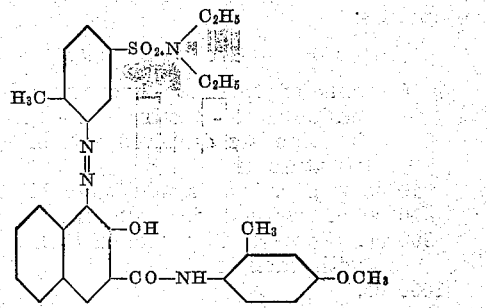

(2) (a) *Grounding liquor*

5.5 grams of 1-(2'.3'-hydroxynapthoyl-amino) - 3 - methyl - 4 - methoxy - benzene are dissolved at boiling temperature with
10 cc. of caustic soda solution of 34° Bé.,
10 cc. of Turkey red oil 1:2 and
900 cc. of water. The whole is then made up with water to
1000 cc.

(b) *Dye bath*

2.9 grams of 2-amino-toluene-4-sulfonic acid-N-methyl-benzyl-amide are diazotized in the usual manner with
3.1 cc. of hydrochloric acide of 20° Bé. and
8 cc. of sodium nitrite solution 1:10. The diazo-solution is then rendered neutral to Congo-paper by means of
72 cc. of sodium acetate solution 1:5,
140 cc. of sodium chloride solution 1:5 are added and the whole is made up with cold water to
1000 cc.

There is obtained a yellowish-red dyeing of very good fastness to washing, to chlorine, to boiling-lye and especially to light. The dyestuff corresponds to the following formula:

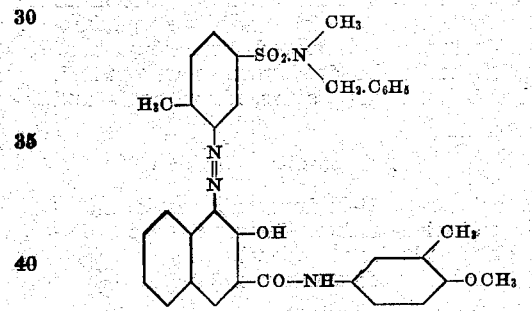

(3) (a) *Grounding liquor*

The grounding liquor is prepared as that described in Example 1.

(b) *Dye bath*

3.06 grams of 2-amino-toluene-4-sulfonic acid-N-methyl-ortho-anisidide are diazotized as described in Examples 1 and 2.

There is obtained a red dyeing of good fastness properties.

(4) (a) *Grounding liquor*

The grounding liquor is prepared as that described in Example 2.

(b) *Dye bath*

2.82 grams of 2-amino-toluene-4-sulfonic acid-N-methyl-cyclohexyl-amide are diazotized as described in Examples 1 and 2.

There is obtained a red dyeing of good fastness properties.

(5) (a) *Grounding liquor*

6 grams of 1 - (2'.3' - hydroxynaphthoyl - amino) - 2 - methyl - 4 - methoxy - benzene are dissolved at boiling temperature in
10 cc. of caustic soda solution of 34° Bé.,
10 cc. of Turkey red oil 1:2 and
900 cc. of water. The whole is then made up with water to
1000 cc.

(b) *Dye bath*

3.66 grams of 2-amino-toluene-4-sulfonic acid dibenzyl-amide are dissolved in
20 cc. of acetone and
3.1 cc. of hydrochloric acid of 20° Bé.; the whole is then diazotized with
8 cc. of sodium nitrite solution 1:10, a small quantity of water is added and the diazo-solution is rendered neutral to Congo-paper by means of
72 cc. of sodium acetate solution 1:5. The whole is then made up with water to
1000 cc.

There is obtained a vivid yellowish-red dyeing of very good fastness to washing, to chlorine, to boiling-lye and especially to light.

(6) (a) *Grounding liquor*

The grounding liquor is prepared as that described in Example 5.

(b) *Dye bath*

3.52 grams of 2-amino-toluene-4-sulfonic acid-N-benzyl-anilide are dissolved in
10 cc. of acetone and
3.1 cc. of hydrochloric acid of 20° Bé.
8 grams of ice are then added and the whole is diazotized with
8 cc. of sodium nitrite solution 1:10. The diazo-solution is then rendered neutral to Congo-paper by means of
72 cc. of sodium acetate solution 1:5,
140 cc. of sodium chloride solution 1:5 are added and the whole is made up with cold water to
1000 cc.

There is obtained a vivid scarlet dyeing of very good fastness properties.

(7) (a) *Grounding liquor*

The grounding liquor is prepared as that described in Example 5.

(b) *Dye bath*

3.58 grams of 2-amino-toluene-4-sulfonic acid-N-cyclohexyl-benzyl-amide are dissolved in
10 cc. of acetone and
3.1 cc. of hydrochloric acid of 20° Bé., and after addition of
10 grams of ice the whole is diazotized with
8 cc. of sodium nitrite solution 1:10. The diazo-solution is rendered neutral to Congo-paper by means of
72 cc. of sodium acetate solution 1:5,
140 grams of sodium chloride solution 1:5 are added and the whole is made up with cold water to
1000 cc.

There is obtained a vivid yellowish-red dyeing of very good fastness to washing, to chlorine, to boiling-lye and especially to light.

(8) (a) *Grounding liquor*

5.5 grams of 1-(2'.3'-hydroxynaphthoyl-amino)-3-methyl-4-methoxy-benzene are dissolved at boiling temperature in
10 cc. of caustic soda solution of 34° Bé.,
10 cc. of Turkey red oil 1:2 and
900 cc. of water. The whole is then made up with water to
1000 cc.

(b) *Dye bath*

3.44 grams of 2-amino-toluene-4-sulfonic acid-N-cyclohexyl-anilide are diazotized as described in Example 7.

There is obtained a yellowish-red dyeing of good fastness properties.

(9) 14.5 grams of 2-amino-toluene-4-sulfonic acid-N-methyl-benzyl-amide are diazotized in the usual manner. Thereupon, the diazo-solution to which sodium acetate has been added in such a quantity as is necessary for binding the excess of hydrochloric acid is introduced, while stirring, into a solution of 15.35 grams of 1-(2'.3'-hydroxynaphthoylamino)-3-methyl-4-methoxy-benzene in dilute caustic soda solution.

The dyestuff which has been precipitated is filtered by suction, well washed and dried. It forms a red powder. The lakes prepared from the dyestuff in the usual manner are fast to oils and yield red tints which are fast to light.

(10) 17.6 grams of 2-amino-toluene-4-sulfonic acid-N-benzyl-anilide are diazotized as described in Example 6. Thereupon, the diazo-solution to which sodium acetate has been added in such a quantity as is necessary for binding the excess of hydrochloric acid is introduced, while stirring, into a solution of 15.35 grams of 1-(2'.3'-hydroxynaphthoylamino)-2-methyl-4-methoxy-benzene in dilute caustic soda solution.

The dyestuff which has been precipitated is filtered by suction, well washed and dried. It forms a red powder. The lakes prepared from the dyestuff in the usual manner yield red tints which are fast to light.

The coupling may also be effected in the presence of a substratum adapted for the production of lakes. The dyestuffs are especially adapted for dyeing rubber goods, since they are fast to vulcanization.

The following table indicates a number of other azo-dyestuffs obtainable according to the present invention:

Since an object of the present invention is to provide dyestuffs of good fastness properties which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble mono-azo-dyestuffs of the following general formula:

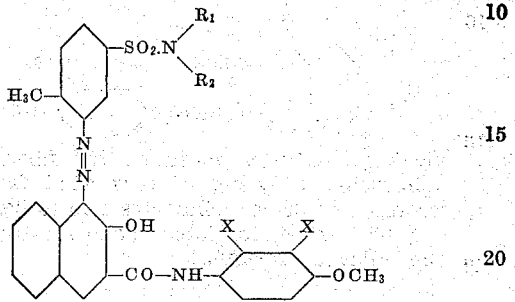

wherein one X stands for hydrogen and the other X for methyl, $R_1$ means an alkyl, aralkyl or a completely hydrogenated hydroaromatic radical and $R_2$ an alkyl, aryl or aralkyl radical, yielding, when produced on the fiber, vivid red dyeings of very good fastness properties, particularly of very good fastness to light.

2. The water-insoluble mono-azo-dyestuffs of the following general formula:

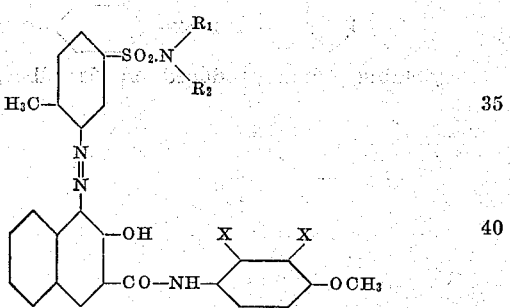

wherein one X stands for hydrogen and the other X for methyl, $R_1$ and $R_2$ mean alkyl or aralkyl radicals, yielding, when produced on the fiber, vivid red dyeings of very good fastness properties, particularly of very good fastness to light.

| | Diazo-compound from 2-amino-toluene-4-sulfonic acid— | Coupled with 1-(2'.3'-hydroxynaphthoylamino) | Tint |
|---|---|---|---|
| 1 | Dimethylamide | 2-methyl-4-methoxy-benzene | Vivid yellowish-red. |
| 2 | Do | 3-methyl-4-methoxy-benzene | Do. |
| 3 | Dipropylamide | 2-methyl-4-methoxy-benzene | Vivid scarlet. |
| 4 | Dibutylamide | ---do--- | Vivid yellowish-red. |
| 5 | Diamylamide | ---do--- | Do. |
| 6 | Methyl-ethylamide | 3-methyl-4-methoxy-benzene | Do. |
| 7 | Methyl-ethanol-amide | 2-methyl-4-methoxy-benzene | Do. |
| 8 | Ethyl-ethanol-amide | ---do--- | Yellowish-red. |
| 9 | Methyl-allyl-amide | 3-methyl-4-methoxy-benzene | Vivid scarlet. |
| 10 | Methyl-propylamide | 2-methyl-4-methoxy-benzene | Do. |
| 11 | Do | 3-methyl-4-methoxy-benzene | Do. |
| 12 | Methyl-butyl-amide | 2-methyl-4-methoxy-benzene | Vivid yellowish-red. |
| 13 | Methyl-isobutyl-amide | ---do--- | Vivid scarlet. |
| 14 | Do | 3-methyl-4-methoxy-benzene | Do. |
| 15 | N-methyl-benzyl-amide | 2-methyl-4-methoxy-benzene | Vivid medium red. |
| 16 | N-ethyl-benzyl-amide | ---do--- | Vivid bluish red. |
| 17 | Do | 3-methyl-4-methoxy-benzene | Vivid yellowish-red. |
| 18 | N-methyl-anilide | 2-methyl-4-methoxy-benzene | Vivid medium red. |
| 19 | N-ethyl-anilide | ---do--- | Vivid yellowish-red. |
| 20 | Do | 3-methyl-4-methoxy-benzene | Vivid scarlet. |
| 21 | N-butyl-anilide | 2-methyl-4-methoxy-benzene | Vivid yellowish-red. |
| 22 | N-methyl-ortho-chloranilide | 3-methyl-4-methoxy-benzene | Do. |
| 23 | N-methyl-(para-methoxy)-benzyl-amide | ---do--- | Vivid scarlet. |
| 24 | Do | 2-methyl-4-methoxy-benzene | Vivid yellowish-red. |
| 25 | N-methyl-(ortho-chloro)-benzyl-amide | ---do--- | Do. |
| 26 | Do | 3-methyl-4-methoxy-benzene | Do. |
| 27 | N-methyl-(para-chloro)-benzyl-amide | ---do--- | Vivid bluish-red. |
| 28 | Do | 2-methyl-4-methoxy-benzene | Vivid yellowish-red. |
| 29 | N-butyl-benzyl-amide | ---do--- | Do. |
| 30 | N-cyclohexyl-anilide | | Scarlet. |
| 31 | N-benzyl-anilide | 3-methyl-4-methoxy-benzene | Do. |
| 32 | N-cyclohexyl-benzyl-amide | ---do--- | Vivid yellowish-red. |
| 33 | Dibenzyl-amide | ---do--- | Scarlet. |

3. The water-insoluble mono-azo-dyestuff of the following formula:

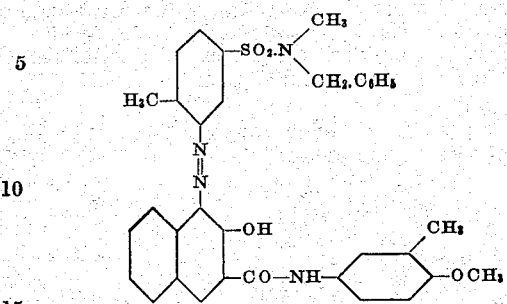

yielding, when produced on the fiber, a vivid yellowish-red dyeing of very good fastness to washing, chlorine, boiling-lye and to light.

4. The water-insoluble mono-azo-dyestuff of the following formula:

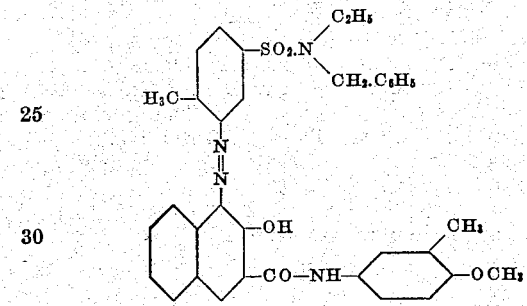

yielding, when produced on the fiber, a vivid yellowish-red dyeing of very good fastness to washing, chlorine, boiling-lye and to light.

5. The water-insoluble mono-azo-dyestuff of the following formula:

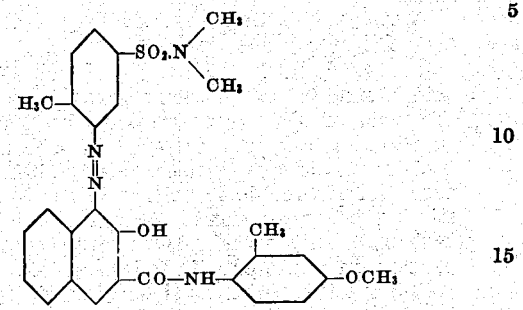

yielding, when produced on the fiber, a vivid yellowish-red dyeing of very good fastness to washing, chlorine, boiling-lye and to light.

6. Fiber dyed with the mono-azo-dyestuffs as claimed in claim 1.
7. Fiber dyed with the mono-azo-dyestuffs as claimed in claim 2.
8. Fiber dyed with the mono-azo-dyestuffs as claimed in claim 3.
9. Fiber dyed with the mono-azo-dyestuffs as claimed in claim 4.
10. Fiber dyed with the mono-azo-dyestuffs as claimed in claim 5.

LEOPOLD LASKA.
ARTHUR ZITSCHER.
ERNST FISCHER.
WILHELM LAMBERZ.